(12) United States Patent
Ramalingam et al.

(10) Patent No.: US 10,173,841 B1
(45) Date of Patent: Jan. 8, 2019

(54) PROGNOSTIC POWER DRIVE UNIT FOR CARGO HANDLING SYSTEM

(71) Applicant: Goodrich Corporation, Charlotte, NC (US)

(72) Inventors: Thirunavukkarasu Ramalingam, Karnataka (IN); Ravi Murthy, Bangalore (IN); Manikandan Mahalingam, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/872,088

(22) Filed: Jan. 16, 2018

(30) Foreign Application Priority Data

Nov. 21, 2017 (IN) .............................. 201711041686

(51) Int. Cl.
| | |
|---|---|
| *B65G 13/06* | (2006.01) |
| *B65G 43/00* | (2006.01) |
| *H02P 29/68* | (2016.01) |
| *H02K 11/24* | (2016.01) |
| *H02K 11/25* | (2016.01) |
| *H02K 11/27* | (2016.01) |
| *H02K 7/14* | (2006.01) |
| *B64D 9/00* | (2006.01) |

(52) U.S. Cl.
CPC ............. *B65G 13/06* (2013.01); *B65G 43/00* (2013.01); *H02K 7/14* (2013.01); *H02K 11/24* (2016.01); *H02K 11/25* (2016.01); *H02K 11/27* (2016.01); *H02P 29/68* (2016.02); *B64D 2009/006* (2013.01)

(58) Field of Classification Search
CPC .......... B65G 13/02; B65G 13/06; B64C 1/20; B64C 1/22; B64D 9/00; B64D 2009/006; H02K 11/24; H02K 11/25; H02K 11/27; H02K 7/14
USPC .................. 198/780, 781.06, 783; 244/118.1
See application file for complete search history.

(56) References Cited

U.S. PATENT DOCUMENTS

| | | | | |
|---|---|---|---|---|
| 6,867,702 | B2 * | 3/2005 | Huber ...................... | B64C 1/20 198/781.06 |
| 8,515,656 | B2 * | 8/2013 | Reed ........................ | B64D 9/00 244/137.1 |
| 8,694,235 | B2 * | 4/2014 | Eadie ....................... | B64D 9/00 701/124 |
| 10,005,564 | B1 * | 6/2018 | Bhatia ..................... | B64D 45/00 |
| 2012/0275485 | A1 * | 11/2012 | Holzner .................... | B64C 1/20 374/1 |
| 2015/0029044 | A1 * | 1/2015 | DuBois .................... | B64D 9/00 340/946 |

(Continued)

*Primary Examiner* — James R Bidwell
(74) *Attorney, Agent, or Firm* — Cantor Colburn LLP

(57) ABSTRACT

A prognostic power drive unit of a cargo handling system includes a motor operable to drive a conveyor system of the cargo handling system. One or more drive system sensors are operable to collect data related to the motor. One or more environmental sensors are operable to collect data related to one or more environmental conditions of the prognostic power drive unit. One or more load detection sensors are operable to detect data related to the conveyor system. The prognostic power drive unit also includes a controller operable to control the motor and determine a health status of the cargo handling system based on at least one of: the one or more drive system sensors, the one or more environmental sensors, and the one or more load detection sensors.

20 Claims, 4 Drawing Sheets

(56) References Cited

U.S. PATENT DOCUMENTS

| | | | |
|---|---|---|---|
| 2016/0117536 A1* | 4/2016 | Johnsen | G06K 7/10366 340/3.1 |
| 2016/0144945 A1* | 5/2016 | Stegmiller | B64C 1/20 244/119 |
| 2016/0147241 A1* | 5/2016 | Kaufman | G05B 15/02 700/291 |

* cited by examiner

PROGNOSTIC POWER DRIVE UNIT FOR CARGO HANDLING SYSTEM

CROSS-REFERENCE TO RELATED APPLICATION

This application claims the benefit of the IN Application No. 201711041686 filed Nov. 21, 2017, which is incorporated herein by reference in its entirety.

BACKGROUND

Embodiments of the present disclosure relate to cargo handling systems of an aircraft, and more particularly, to a prognostic power drive unit for a cargo handling system.

Cargo handling systems are typically used in a variety of applications to move or situate cargo in a particular area of a vehicle, such as a ship, truck, or aircraft. An aircraft cargo handling system typically includes a roller conveyor system mounted to a cross beam of the aircraft which enables pallets or containers to be moved easily in and out of the aircraft cargo compartment. A unit load device (ULD) is a pallet or container used to load luggage, freight, and mail on a wide-body aircraft. The roller conveyor system is typically driven by a plurality of power drive units (PDUs) that provide tractive force to move cargo in and out of cargo compartments. Some cargo handling systems can include dozens of PDUs. Failed or degraded performance of a PDU can cause delays and hinder cargo movement.

BRIEF DESCRIPTION

According to an embodiment, a prognostic power drive unit of a cargo handling system includes a motor operable to drive a conveyor system of the cargo handling system. One or more drive system sensors are operable to collect data related to the motor. One or more environmental sensors are operable to collect data related to one or more environmental conditions of the prognostic power drive unit. One or more load detection sensors are operable to detect data related to the conveyor system. The prognostic power drive unit also includes a controller operable to control the motor and determine a health status of the cargo handling system based on at least one of: the one or more drive system sensors, the one or more environmental sensors, and the one or more load detection sensors.

In addition to one or more of the features described above, or as an alternative to any of the foregoing embodiments, further embodiments may include where the controller is operable to transmit the health status and data from at least one of: the one or more drive system sensors, the one or more environmental sensors, and the one or more load detection sensors to a maintenance system through a network link for remote maintenance analysis.

In addition to one or more of the features described above, or as an alternative to any of the foregoing embodiments, further embodiments may include where the controller includes one or more timer operable to determine a usage time of the prognostic power drive unit and predict a needed maintenance action based on a combination of the usage time and data from at least one of: the one or more drive system sensors, the one or more environmental sensors, and the one or more load detection sensors.

In addition to one or more of the features described above, or as an alternative to any of the foregoing embodiments, further embodiments may include where the one or more drive system sensors include a current sensor operable to measure a three phase current of the motor, and the controller is operable to control the motor based on current data from the current sensor and estimate a developed torque of the motor to determine a motor health status.

In addition to one or more of the features described above, or as an alternative to any of the foregoing embodiments, further embodiments may include where the one or more drive system sensors include a torque sensor operable to measure a traction force developed by the motor, and the controller is operable to compare the traction force to the developed torque to determine the motor health status and compare the traction force to a load requirement of a unit load device on the conveyor system.

In addition to one or more of the features described above, or as an alternative to any of the foregoing embodiments, further embodiments may include a power switcher operable to switch the three phase current responsive to the controller, where the current sensor is electrically coupled between the power switcher and the motor.

In addition to one or more of the features described above, or as an alternative to any of the foregoing embodiments, further embodiments may include where the power switcher is a triode for alternating current bridge module including short circuit and overload protection.

In addition to one or more of the features described above, or as an alternative to any of the foregoing embodiments, further embodiments may include a fault detection coupler operable to provide feedback to the controller to detect one or more phase faults in the three phase current between the power switcher and the motor.

In addition to one or more of the features described above, or as an alternative to any of the foregoing embodiments, further embodiments may include where the one or more environmental sensors include a printed circuit board temperature sensor and a humidity sensor operable to detect the one or more environmental conditions within a housing of the prognostic power drive unit.

In addition to one or more of the features described above, or as an alternative to any of the foregoing embodiments, further embodiments may include where the one or more load detection sensors include one or more digitally controlled infrared sensors operable to detect a presence of one or more unit load devices on the conveyor system.

According to another embodiment, a method of health monitoring for a cargo handling system. The method includes monitoring, by a prognostic power drive unit of the cargo handling system, one or more drive system sensors to collect data related to a motor operable to drive a conveyor system of the cargo handling system. The prognostic power drive unit monitors one or more environmental sensors to collect data related to one or more environmental conditions of the prognostic power drive unit. The prognostic power drive unit monitors one or more load detection sensors to detect data related to the conveyor system. The prognostic power drive unit determines a health status of the cargo handling system based on at least one of: the one or more drive system sensors, the one or more environmental sensors, and the one or more load detection sensors. The prognostic power drive unit adjusts a control aspect of the motor based on the health status.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Embodiments provide enhanced prognostic support features for a power drive unit (PDU) of a cargo handling system. The prognostic support features can include sensing systems that enable detection of existing faults and prediction of future issues/likely maintenance needs. A combination of sensors and an ability of a controller within the PDU to determine a health status can be further supplemented through remote maintenance analysis through a network link, e.g., one or more cloud computing resources.

Figure 1:
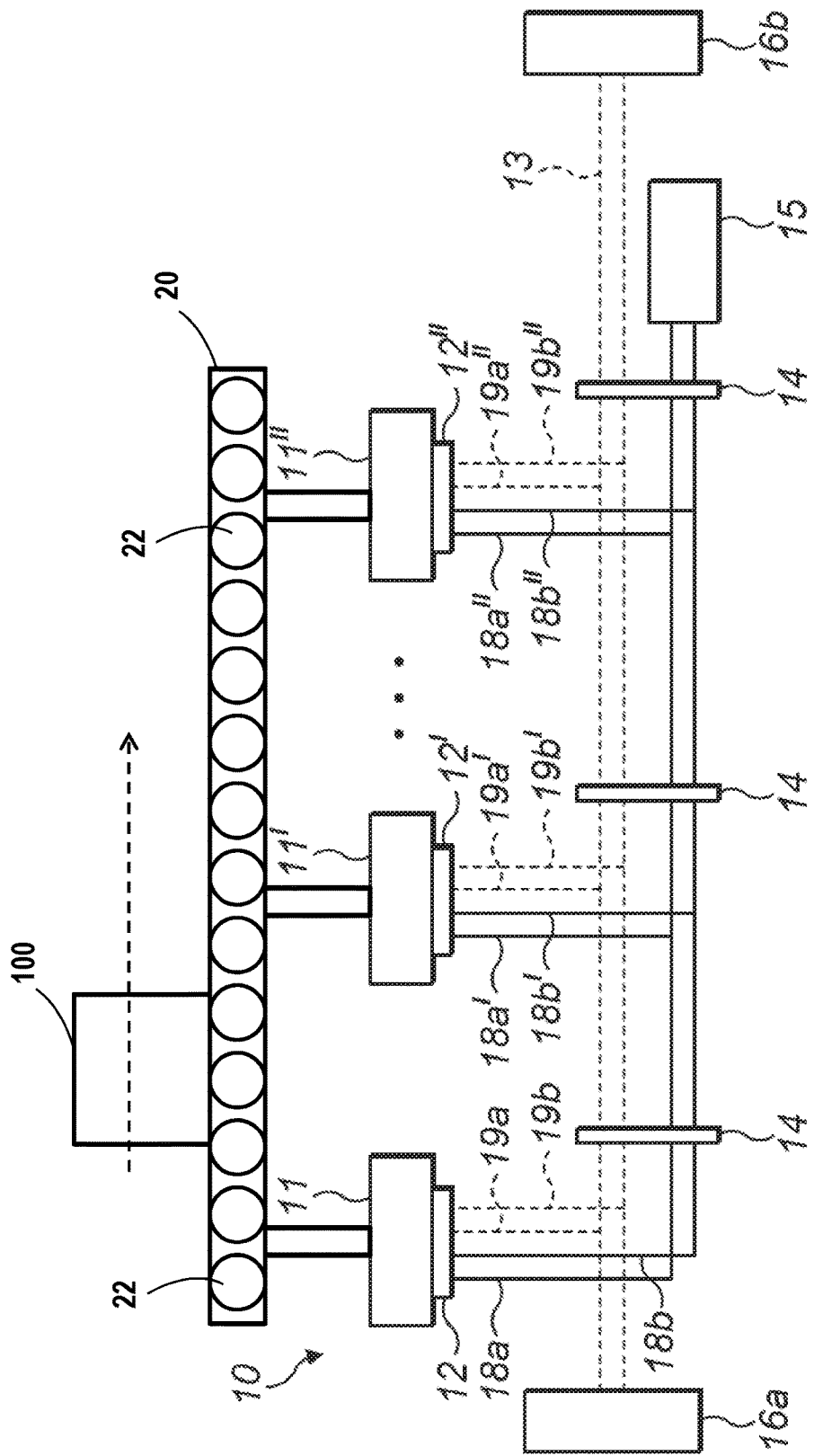
FIG. 1 is a schematic view of an example of a cargo handling system in accordance with an embodiment of the disclosure.

Referring now to FIG. 1, an example of a cargo handling system 10 for use in an aircraft is illustrated. The cargo handling system 10 can be mounted to a cross beam of an aircraft cargo compartment, which is typically supported by an aircraft substructure. The cargo handling system 10 includes a plurality of power drive units (PDUs), 11, 11', 11" for moving cargo and loading and unloading cargo containers, also referred to as one or more unit load devices (ULDs) 100, into and out of an aircraft. In the example of FIG. 1, an input connector 12, 12', 12" including controller area networks (CAN)_Hi, 19a, and CAN_Lo, 19b and power wires (e.g., direct current (DC)+, DC- and ground wires) connects the circuitry of each of the PDUs 11, 11', 11" to a plurality of wires including power wires 18a, 18b, 18a', 18b', 18a", 18b" and communication wires 19a, 19b, 19a', 19b', 19a", 19b". The communication wires 19a, 19b, 19a', 19b', 19a", 19b" form a CAN communication bus 13 which has different branches to the PDUs 11, 11', 11". The CAN communication bus 13 can extend between a CAN node 16b and a termination 16a. Power wires 18a, 18b, 18a', 18b', 18a", 18b" can also extend between the input connector 12, 12', 12" of each of the PDUs 11, 11', 11", and the power source 15 (an alternating current (AC) fed rectifier that generates a DC bus). The communication wires 19a, 19b, 19a', 19b', 19a", 19b" can be routed in parallel to the power wires 18a, 18b, 18a', 18b', 18a", 18b" along the length of the system and may be retained by harnesses 14. Although one example of wire connections is depicted in FIG. 1, it will be understood that multiple variations of wired and wireless connections and any number of PDUs 11, 11', 11" are contemplated.

Figure 2:
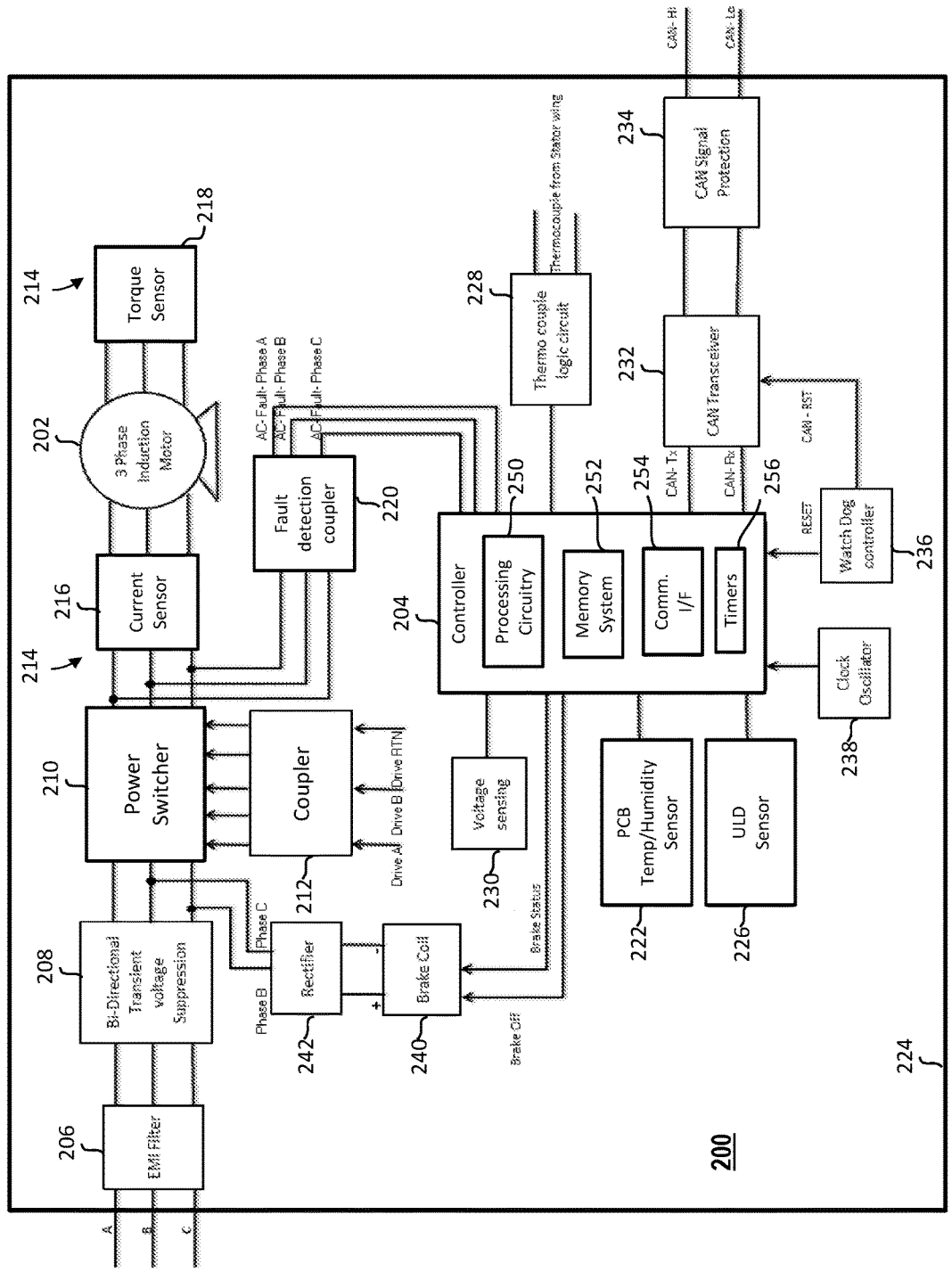
FIG. 2 is a block diagram of a prognostic power drive unit of the example of a cargo handling system of FIG. 1 in accordance with an embodiment of the disclosure.

Continuing with the example of FIG. 1 and with further reference to FIG. 2, PDUs 11, 11', 11" are operable to drive movement of a conveyor system 20 that includes a plurality of traction rollers 22 to move one or more ULDs 100 in a desired direction of travel, e.g., forward or aft with respect to a cargo compartment. Movement of the conveyor system 20 can be driven through a motor within each PDU 11, 11', 11", such as motor 202 in the example of FIG. 2. The motor 202 can be a three phase induction motor, for example, that is controlled by switch commands from a controller 204. A prognostic PDU (PPDU) 200, as depicted in FIG. 2, is an embodiment of the PDUs 11, 11', 11" including prognostic support features as further described herein. The PPDU 200 can include an electromagnetic interference (EMI) filter 206 operable to filter a three phase input current and bidirectional transient voltage suppression 208 to further filter the three phase current before reaching the motor 202. A power switcher 210 of the PPDU 200 is operable to switch the three phase current responsive to the controller 204. The power switcher 210 can be a triode for alternating current (TRIAC) bridge module including short circuit and overload protection, rather than bulkier discrete TRIAC components. Switch commands from the controller 204 may be routed to the power switcher 210 through a coupler 212. The coupler 212 can be an optocoupler, for example, depending on the signal format output by the controller 204 and the signal format requirements of the power switcher 210.

One or more drive system sensors 214 are operable to collect data related to the motor 202. The drive system sensors 214 can include, for example, a current sensor 216 and/or a torque sensor 218. The current sensor 216 can be electrically coupled between the power switcher 210 and the motor 202. The torque sensor 218 is operable to measure a traction force developed by the motor 202. A fault detection coupler 220 can provide feedback to the controller 204 to detect one or more phase faults in the three phase current between the power switcher 210 and the motor 202. The controller 204 can also receive sensor signals from one or more environmental sensors 222 operable to collect data related to one or more environmental conditions of the PPDU 200. Examples of the environmental sensors 222 can include, for example, a printed circuit board (PCB) temperature sensor and a humidity sensor operable to detect the one or more environmental conditions within a housing 224 of the PPDU 200. Changes in temperature and moisture within the housing 224 may impact efficiency of power drive electronics and/or operation of the motor 202. The controller 204 can also receive sensor signals from one or more load detection sensors 226 operable to detect data related to the conveyor system 20 of FIG. 1. The one or more load detection sensors 226 can include one or more digitally controlled infrared (IR) sensors operable to detect a presence (and/or movement) of one or more ULDs 100 on the conveyor system 20 of FIG. 1.

The controller 204 can also interface with a thermocouple logic circuit 228 to monitor temperature of a stator winding of the motor 202, for instance, using a thermocouple (not depicted). Local power supply voltages can be monitored by the controller 204 through voltage sensing 230 to ensure that one or more voltage rails are within desired ranges. Communication on the CAN communication bus 13 of FIG. 1 with the controller 204 can be managed through a CAN transceiver 232 and CAN signal protection 234. Both the controller 204 and the CAN transceiver 232 can be subject to reset by a watchdog controller 236. For example, if the watchdog controller 236 does not receive a timely update from the controller 204, the watchdog controller 236 may issue a reset command to prevent errant transmissions by the CAN transceiver 232 or errant control actions by the controller 204. Timing within the controller 204 can be established with respect to a clock oscillator 238. The controller 204 may also control a brake coil 240 as powered by a rectifier 242 to slow the motor 202.

The controller 204 can include processing circuitry 250, a memory system 252, a communication interface 254, timers 256, and other elements (not depicted). As one example, the controller 204 can be wireless microcontroller to support wireless transmission with various sensor modules and to enable configuration flexibility as additional sensor modules are added to the PPDU 200. However, it will be understood that various configuration options can be included within the controller 204. For example, the processing circuitry 250 can be embodied as any type of central processing unit (CPU), including a microprocessor, a digital signal processor (DSP), a microcontroller, an application specific integrated circuit (ASIC), a field programmable gate array (FPGA), or the like. Also, in embodiments, the memory system 252 may include random access memory (RAM), read only memory (ROM), or other electronic, optical, magnetic, or any other computer readable medium onto which is stored data and algorithms as executable instructions in a non-transitory form. Different communication protocols and data rates can be supported by the communication interface 254 to communication with various sensors of the PPDU 200 and/or with the CAN transceiver 232. The timers 256 can track various time-based features for usage monitoring related to the conveyor system 20 of FIG. 1, trigger updates to the watchdog controller 236, and/or assist with determining when future preventive maintenance actions will be needed.

In embodiments, values used by control laws in controlling switch timing of the power switcher 210 and/or applying a braking force through the brake coil 240 may be adjusted based on one or more health status values determined by the controller 204. For example, the current sensor 216 can measure three phase current being provided to the motor 202 to assist in commuting two orthogonal axis components, such as magnetizing current and torque producing current to estimate a developed torque of the motor 202. Torque estimates can be compared with measured torque values from the torque sensor 218 to confirm whether components are operating within performance parameters. Trending can be performed to track changes indicative of reduced performance trends prior to actually reaching a fault condition. Health status values can be assessed on a per line replaceable unit basis to flag when specific components have failed or are headed toward a predicted failure (e.g., based on sensed degraded performance and/or time-based usage limits).

Figure 3:
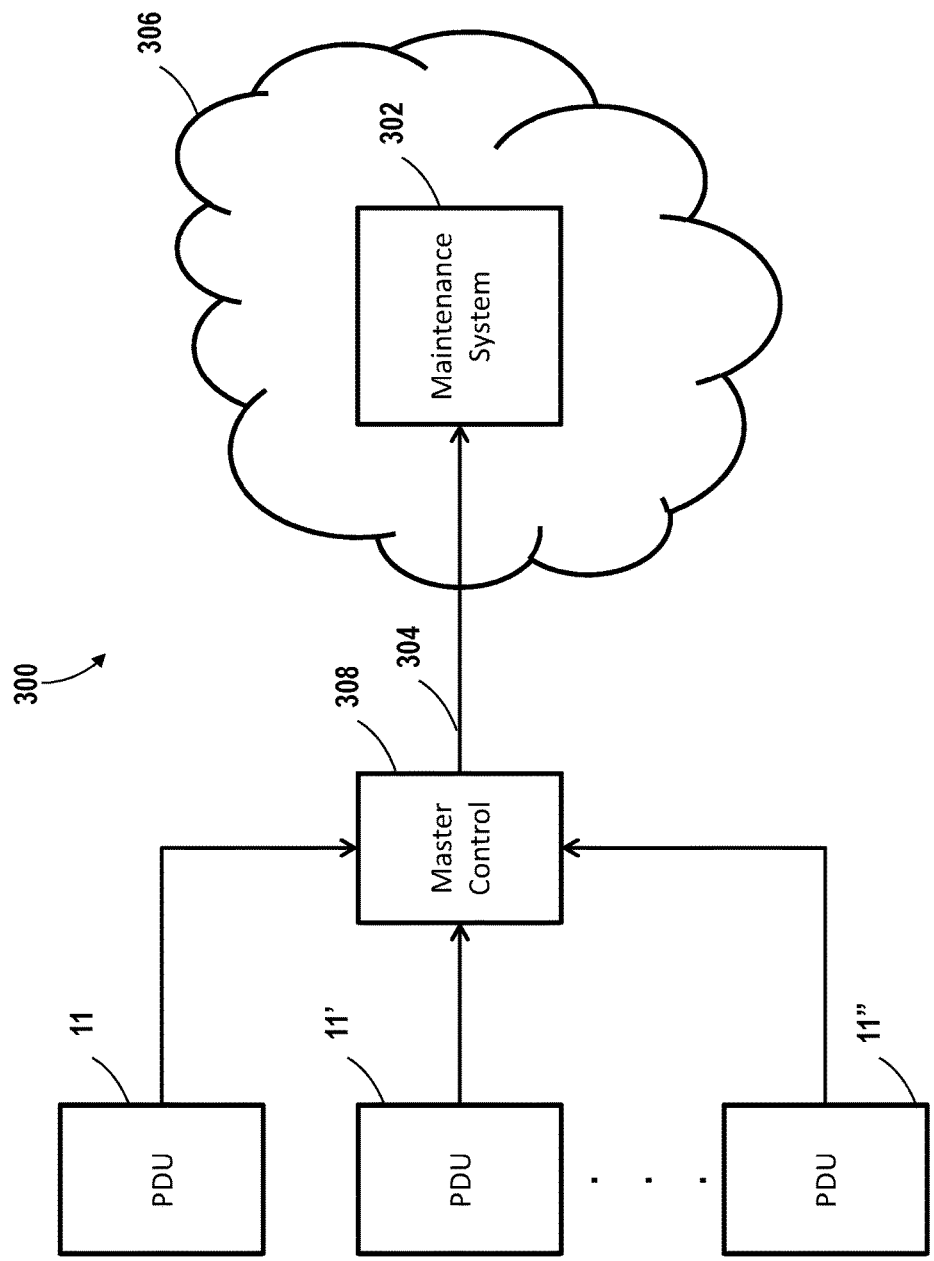
FIG. 3 is a schematic view of a cargo handling system communication interface with a remote system in accordance with an embodiment of the disclosure.

In some embodiments, the controller 204 is operable to transmit a health status and data from at least one of: the one or more drive system sensors 214, the one or more environmental sensors 222, and the one or more load detection sensors 226 to a maintenance system 302 through a network link 304 for remote maintenance analysis as depicted in the example of FIGS. 2 and 3. In the example of FIG. 3, a cargo handling system communication interface 300 enables communication with a remote system in a network environment 306, such as the maintenance system 302. For example, health status data from each PDU 11, 11', 11" implemented as the PPDU 200 can be routed through a master control 308 to the maintenance system 302. Although depicted as a single system in FIG. 3, the maintenance system 302 can be distributed, for instance, through cloud computing resources at various locations in the network environment 306. The master control 308 can serve as a data concentrator and firewall between the PDUs 11, 11', 11" and the maintenance system 302. In some embodiments, the maintenance system 302 detects trends for each PDU 11, 11', 11" and/or across the collection of PDUs 11, 11', 11" and can inform each PDU 11, 11', 11" of likely future faults. Although depicted with the master control 308, in some embodiments, the PDUs 11, 11', 11" can directly communicate with the maintenance system 302.

Figure 4:
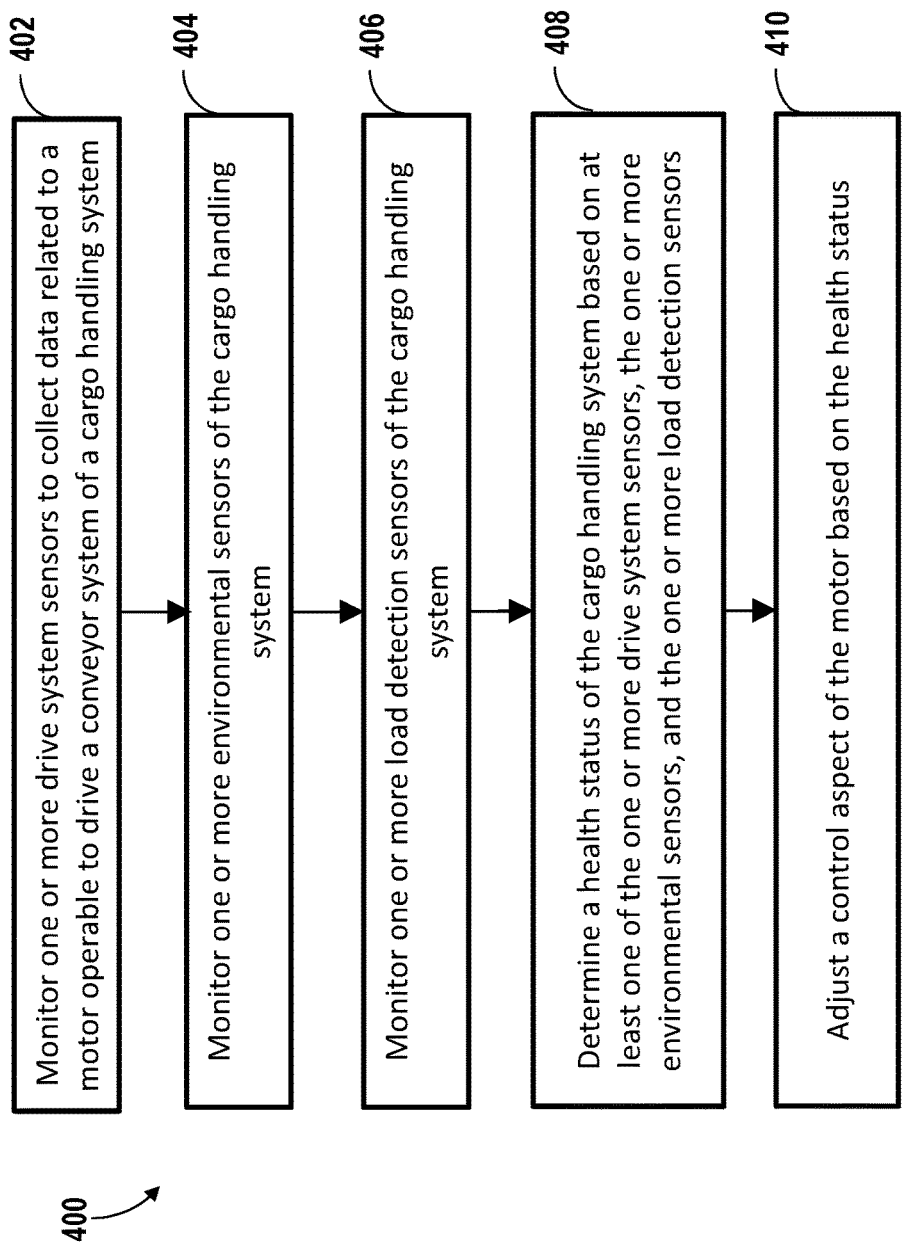
FIG. 4 is a process for health monitoring of a cargo handling system in accordance with an embodiment of the disclosure.

FIG. 4 depicts a flow process 400 of health monitoring for a cargo handling system, such as the cargo handling system 10 of FIG. 1 as shown and described herein and/or by variations thereon. Various aspects of the flow process 400 can be carried out using one or more sensors, one or more processors, and/or one or more machines and/or controllers. For example, some aspects of the flow process involve sensors, as described above, in communication with the controller 204 of FIG. 2 and/or other processing systems, such as master control 308 and/or maintenance system 302 as previously described. The flow process 400 is described in reference to FIGS. 1-4.

At block 402, a PPDU 200 of the cargo handling system 10 (e.g., within each PDU 11, 11', 11") monitors one or more drive system sensors 214 to collect data related to a motor 202 operable to drive a conveyor system 20 of the cargo handling system 10. The one or more drive system sensors 214 can include a current sensor 216 operable to measure a three phase current of the motor 202. The controller 204 can be operable to control the motor 202 based on current data from the current sensor 216 and estimate a developed torque of the motor 202 to determine a motor health status. The one or more drive system sensors 214 can include a torque sensor 218 operable to measure a traction force developed by the motor 202, and the controller 204 can be operable to compare the traction force to the developed torque to determine the motor health status and compare the traction force to a load requirement of a ULD 100 on the conveyor system 20.

At block 404, the PPDU 200 monitors one or more environmental sensors 222 to collect data related to one or more environmental conditions of the PPDU 200. The one or more environmental sensors 222 can include a PCB temperature sensor, a humidity sensor, and/or other such sensors operable to detect the one or more environmental conditions within a housing 224 of the PPDU 200.

At block 406, the PPDU 200 monitors one or more load detection sensors 226 to detect data related to the conveyor system 20. The one or more load detection sensors 226 can include one or more digitally controlled IR sensors operable to detect a presence of one or more ULDs 100 on the conveyor system 20. The one or more load detection sensors 226 can also detect movement of the ULDs 100 on the conveyor system 20.

At block 408, the PPDU 200 determines a health status of the cargo handling system 10 based on at least one of: the one or more drive system sensors 214, the one or more environmental sensors 222, and the one or more load detection sensors 226. In some embodiments, the PPDU 200 can transmit the health status and data from at least one of: the one or more drive system sensors 214, the one or more environmental sensors 222, and the one or more load detection sensors 226 to a maintenance system 302 through a network link 304 for remote maintenance analysis. In some embodiments, the PPDU 200 can operate one or more timer 256 to determine a usage time of the PPDU 200 and predict a needed maintenance action based on a combination of the usage time and data from at least one of: the one or more drive system sensors 214, the one or more environmental sensors 222, and the one or more load detection sensors 226.

At block 410, the PPDU 200 adjusts a control aspect of the motor 202 based on the health status. The control aspect can include altering a current to torque relationship at the conveyor system 20, e.g., increasing the current to overcome degraded conditions of the traction rollers 22. The control aspect may include altering a braking force applied through brake coil 240 depending on environmental conditions and/or the presence of ULDs 100. Environmental conditions and/or motor temperature may result in adjusting a maximum current to reduce heat, for example. Temperature and/or moisture exposure to sensitive components may be tracked with time and temperature/moisture tracking using timers 256 in performing remaining component life predictions and/or to trigger preventative actions, for instance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A prognostic power drive unit of a cargo handling system, the prognostic power drive unit comprising:
   a motor operable to drive a conveyor system of the cargo handling system;
   one or more drive system sensors operable to collect data related to the motor;
   one or more environmental sensors operable to collect data related to one or more environmental conditions of the prognostic power drive unit;
   one or more load detection sensors operable to detect data related to the conveyor system; and
   a controller operable to control the motor and determine a health status of the cargo handling system based on at least one of: the one or more drive system sensors, the one or more environmental sensors, and the one or more load detection sensors.

2. The prognostic power drive unit according to claim 1, wherein the controller is operable to transmit the health status and data from at least one of: the one or more drive system sensors, the one or more environmental sensors, and the one or more load detection sensors to a maintenance system through a network link for remote maintenance analysis.

3. The prognostic power drive unit according to claim 1, wherein the controller comprises one or more timer operable to determine a usage time of the prognostic power drive unit and predict a needed maintenance action based on a combination of the usage time and data from at least one of: the one or more drive system sensors, the one or more environmental sensors, and the one or more load detection sensors.

4. The prognostic power drive unit according to claim 1, wherein the one or more drive system sensors comprise a current sensor operable to measure a three phase current of the motor, and the controller is operable to control the motor based on current data from the current sensor and estimate a developed torque of the motor to determine a motor health status.

5. The prognostic power drive unit according to claim 4, wherein the one or more drive system sensors comprise a torque sensor operable to measure a traction force developed by the motor, and the controller is operable to compare the traction force to the developed torque to determine the motor health status and compare the traction force to a load requirement of a unit load device on the conveyor system.

6. The prognostic power drive unit according to claim 4, further comprising a power switcher operable to switch the three phase current responsive to the controller, wherein the current sensor is electrically coupled between the power switcher and the motor.

7. The prognostic power drive unit according to claim 6, wherein the power switcher is a triode for alternating current bridge module comprising short circuit and overload protection.

8. The prognostic power drive unit according to claim 6, further comprising a fault detection coupler operable to provide feedback to the controller to detect one or more phase faults in the three phase current between the power switcher and the motor.

9. The prognostic power drive unit according to claim 1, wherein the one or more environmental sensors comprise a printed circuit board temperature sensor and a humidity sensor operable to detect the one or more environmental conditions within a housing of the prognostic power drive unit.

10. The prognostic power drive unit according to claim 1, wherein the one or more load detection sensors comprise one or more digitally controlled infrared sensors operable to detect a presence of one or more unit load devices on the conveyor system.

11. A method of health monitoring for a cargo handling system, comprising:
    monitoring, by a prognostic power drive unit of the cargo handling system, one or more drive system sensors to collect data related to a motor operable to drive a conveyor system of the cargo handling system;
    monitoring, by the prognostic power drive unit, one or more environmental sensors to collect data related to one or more environmental conditions of the prognostic power drive unit;
    monitoring, by the prognostic power drive unit, one or more load detection sensors to detect data related to the conveyor system;
    determining, by the prognostic power drive unit, a health status of the cargo handling system based on at least one of: the one or more drive system sensors, the one or more environmental sensors, and the one or more load detection sensors; and
    adjusting, by the prognostic power drive unit, a control aspect of the motor based on the health status.

12. The method of claim 11, further comprising:
transmitting the health status and data from at least one of: the one or more drive system sensors, the one or more environmental sensors, and the one or more load detection sensors to a maintenance system through a network link for remote maintenance analysis.

13. The method of claim 11, further comprising:
operating one or more timer to determine a usage time of the prognostic power drive unit and predict a needed maintenance action based on a combination of the usage time and data from at least one of: the one or more drive system sensors, the one or more environmental sensors, and the one or more load detection sensors.

14. The method of claim 11, wherein the one or more drive system sensors comprise a current sensor operable to measure a three phase current of the motor, and the method further comprises:
controlling the motor based on current data from the current sensor; and
estimating a developed torque of the motor to determine a motor health status.

15. The method of claim 14, wherein the one or more drive system sensors comprise a torque sensor operable to measure a traction force developed by the motor, and the method further comprises:
comparing the traction force to the developed torque to determine the motor health status; and
comparing the traction force to a load requirement of a unit load device on the conveyor system.

16. The method of claim 14, further comprising:
switching, by a power switcher, the three phase current responsive to a controller of the prognostic power drive unit, wherein the current sensor is electrically coupled between the power switcher and the motor.

17. The method of claim 16, wherein the power switcher is a triode for alternating current bridge module comprising short circuit and overload protection.

18. The method of claim 16, further comprising:
providing feedback through a fault detection coupler to the controller to detect one or more phase faults in the three phase current between the power switcher and the motor.

19. The method of claim 11, wherein the one or more environmental sensors comprise a printed circuit board temperature sensor and a humidity sensor operable to detect the one or more environmental conditions within a housing of the prognostic power drive unit.

20. The method of claim 11, wherein the one or more load detection sensors comprise one or more digitally controlled infrared sensors operable to detect a presence of one or more unit load devices on the conveyor system.

* * * * *